(12) United States Patent
Kim et al.

(10) Patent No.: US 7,362,733 B2
(45) Date of Patent: Apr. 22, 2008

(54) TRANSMITTING/RECEIVING APPARATUS AND METHOD FOR PACKET RETRANSMISSION IN A MOBILE COMMUNICATION SYSTEM

(75) Inventors: Noh-Sun Kim, Taejon-Kwangyok-shi (KR); Gin-Kyu Choi, Seoul (KR); Yong-Suk Moon, Songnam-shi (KR); Hun-Kee Kim, Seoul (KR); Jae-Seung Yoon, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 1115 days.

(21) Appl. No.: 10/281,719

(22) Filed: Oct. 28, 2002

(65) Prior Publication Data

US 2003/0081576 A1 May 1, 2003

(30) Foreign Application Priority Data

Oct. 31, 2001 (KR) ................ 10-2001-0067694

(51) Int. Cl.
H04B 7/216 (2006.01)

(52) U.S. Cl. ............ 370/335; 370/342; 370/203
(58) Field of Classification Search ........ 370/335, 370/342, 394, 203
See application file for complete search history.

(56) References Cited

U.S. PATENT DOCUMENTS 6,956,855 B1 * 10/2005 Chang .............. 370/394
6,961,327 B2 * 11/2005 Niu .............. 370/338
7,069,490 B2 * 6/2006 Niu et al. .............. 714/748
2005/0002464 A1 1/2005 Fan et al.

FOREIGN PATENT DOCUMENTS

| DE | 102 48 018 | 10/2002 |
| EP | 1 347 593 | 9/2003 |
| GB | 2 381 718 | 5/2003 |
| GB | 2 382 010 | 5/2003 |
| WO | WO 03/019794 | 3/2003 |

OTHER PUBLICATIONS

Japanese Office Action dated Jun. 24, 2003 issued in a counterpart application, namely Appln. No. 2002-316689.

(Continued)

Primary Examiner—Brian Nguyen
(74) Attorney, Agent, or Firm—The Farrell Law Firm, P.C.

(57) ABSTRACT

A transmitting/receiving apparatus and method for packet retransmission in a mobile communication system. Upon request for a retransmission from a receiver, a transmitter generates first coded bits by inverting initially transmitted coded bits, generates second coded bits by separating the initially transmitted coded bits into a first bit group having a relatively high priority and a second bit group having a relatively low priority and exchanging the first bit group with the second bit group, and generates third coded bits by inverting the exchanged coded bits. The transmitter selects one of the first coded bits, the second coded bits according to the sequence number of a retransmission request received from the receiver, and the third coded bits and maps the selected coded bits to modulation symbols. The transmitter then transmits the modulation symbols to the receiver.

23 Claims, 14 Drawing Sheets

OTHER PUBLICATIONS

"Enhanced HARQ Method with Signal Constellation Rearrangement", TSG-RAN Working Group 1 Meeting #19, Feb. 27-Mar. 2, 2001.

"Performance Evaluation of the Enhanced Symbol Mapping Method based on Priority (SMP) in HSDPA", 3GPP TSG-RAN WG1 Meeting #20, May 21-25, 2001.

Combined Search and Examination Report dated Dec. 1, 2003 issued in a counterpart application, namely, Appln. No. GB0325480.2.

Schmitt, Improved Retransmission Strategy for Hybrid ARQ Schemes Employing TCM, 1999 IEEE, pp. 1226-1228.

* cited by examiner

| | BIT 1 | BIT 2 | BIT 3 | BIT 4 | BIT 5 | BIT 6 | BIT 7 | BIT 8 | BIT 9 | BIT 10 | BIT 11 | BIT 12 |
|---|---|---|---|---|---|---|---|---|---|---|---|---|
| ORIGINAL BITS | 0 | 0 | 0 | 0 | 1 | 1 | 0 | 0 | 0 | 1 | 1 | 1 |
| | SYMBOL 1 | | | | SYMBOL 2 | | | | SYMBOL 3 | | | |
| RETRANSMISSION BITS | 1 | 1 | 1 | 1 | 0 | 0 | 1 | 1 | 1 | 0 | 0 | 0 |

FIG.9

TRANSMITTING/RECEIVING APPARATUS AND METHOD FOR PACKET RETRANSMISSION IN A MOBILE COMMUNICATION SYSTEM

PRIORITY

This application claims priority to an application entitled "Transmitting/Receiving Apparatus and Method for Packet Retransmission in a Mobile Communication System" filed in the Korean Industrial Property Office on Oct. 31, 2001 and assigned Ser. No. 2001-67694, the contents of which are hereby incorporated by reference.

BACKGROUND OF THE INVENTION

1. Field of the Invention

The present invention relates generally to a W-CDMA (Wide-band Code Division Multiple Access) mobile communication system, and in particular, to a transmitting/receiving apparatus and method for reducing a transmission error rate and thus increasing decoding performance at retransmission.

2. Description of the Related Art

Adverse influences on high-speed, high-quality data service are attributed to a channel environment in a mobile communication system. The radio channel environment varies frequently because of signal power changes caused by white noise and fading, shadowing, the Doppler effect that occurs due to the movement and frequent velocity change of a terminal, and interference from other users and multi-path signals. Therefore, aside from conventional technologies in the second or third generation mobile communication system, an advanced technique is required to support wireless high-speed data packet service. In this context, the 3GPP ($3^{rd}$ Generation Partnership Project) and the 3GPP2 commonly addressed the techniques of AMCS (Adaptive Modulation & Coding Scheme) and HARQ (Hybrid Automatic Repeat Request).

The AMCS adjusts a modulation order and a code rate according to changes in downlink channel condition. The downlink channel quality is usually obtained by measuring the SNR (Signal-to-Noise Ratio) of a received signal at a UE (User Equipment). The UE transmits the channel quality information to a BS (Base Station) on an uplink. Then the BS estimates the downlink channel condition based on the channel quality information and determines an appropriate modulation scheme and code rate according to the estimated downlink channel condition.

QPSK (Quadrature Phase Shift Keying), 8PSK (8-ary PSK), and 16QAM (16-ary Quadrature Amplitude Modulation) and code rates of ½ and ¼ are considered in the current high-speed wireless data packet communication system. In AMCS, a BS applies a high-order modulation (e.g., 16QAM and 64QAM) and a high code rate of ¾ to a UE having good channel quality such as its adjacent UEs, and a low-order modulation (e.g., 8PSK and QPSK) and a low code rate of ½ to a UE having bad channel quality such as a UE at a cell boundary. The AMCS reduces interference signals remarkably and improves system performance, as compared to the conventional method relying on high-speed power control.

HARQ is a retransmission control technique to correct errors in initially transmitted data packets. Schemes for implementing HARQ include chase combining (CC), full incremental redundancy (FIR), and partial incremental redundancy (PIR).

With CC, the entire initial transmission packet including systematic bits and parity bits is retransmitted. A receiver combines the retransmission packet with the initial transmission packet stored in a reception buffer. The resulting increase of the transmission reliability of coded bits input to a decoder brings the performance gain of the overall mobile communication system. An approximate 3-dB performance gain is effected on average since combining of the same two packets is equivalent to repeated coding of the packet.

In FIR, a packet having only parity bits, different from an initial transmission packet, is retransmitted to thereby increase a decoding gain. A decoder decodes data using the new parity bits as well as initially transmitted systematic and parity bits. As a result, decoding performance is improved. It is well known in coding theory that a higher performance gain is yielded at a low code rate than by repeated coding. Therefore, FIR is superior to CC in terms of performance gain.

As compared to FIR, PIR is a retransmission scheme in which a packet having systematic bits and new parity bits is retransmitted. A receiver combines the retransmitted systematic bits with initially transmitted systematic bits for decoding, achieving similar effects to those of CC. PIR is also similar to FIR in that the new parity bits are used for decoding. Since PIR is implemented at a relatively high code rate than FIR, PIR is in the middle of FIR and CC in performance.

A combined use of the independent techniques of increasing adaptability to varying channel condition, AMCS and HARQ can improve system performance significantly.

FIG. 1 is a block diagram of a transmitter in a typical high-speed wireless data packet communication system. Referring to FIG. 1, the transmitter includes a channel encoder 110, a rate matching controller 120, an interleaver 130, a modulator 140, and a controller 150.

Upon input of information bits in transport blocks of size N, the channel encoder 110 encodes the information bits at a code rate R (=n/k, n and k are prime), for example, ½ or ¾. With the code rate R, the channel encoder 110 outputs n coded bits for the input of k information bits. The channel encoder 110 can support a plurality of code rates using a mother code rate of ⅙ or ⅓ through symbol puncturing or symbol repetition. The controller 150 controls the code rate.

The future mobile communication system adopts turbo coding considered a more robust channel coding technique for high-speed reliable transmission of multimedia data. It is known that turbo coding has the nearest Shannon Limit performance in BER (Bit Error Rate) at a low SNR. Turbo coding is also adopted in the 1×EV-DV (Evolution in Data and Voice) standards which are under discussion in the 3GPP and 3GPP2.

The output of the channel encoder 110 being a turbo encoder includes systematic bits and parity bits. The systematic bits are information bits to be transmitted and the parity bits are error correction bits added to the information bits for a receiver to correct errors generated during transmission of the information bits at decoding.

The rate matching controller 120 generally matches the data rate of the coded bits generally by transport channel-multiplexing, or by repetition and puncturing if the number of the coded bits is different from that of bits transmitted in the air. To minimize data loss caused by burst errors, the interleaver 130 interleaves the rate-matched bits. Interleaving distributes damaged bits in a fading environment. Therefore, the interleaving allows adjacent bits to be randomly influenced by fading and thus prevents burst errors, increasing channel encoding performance. The modulator 140 maps the interleaved bits to symbols in a modulation scheme determined by the controller 150.

The controller 150 selects the code rate and the modulation scheme according to the radio downlink channel condition. To selectively use QPSK, 8PSK, 16QAM, and 64QAM according to the radio environment, the controller 150 supports AMCS. Though not shown, a UE spreads the modulated data with a plurality of Walsh codes to identify transport channels and with a PN (Pseudorandom Noise) code to identify a BS.

As stated before, the modulator 140 supports various modulation schemes including QPSK, 8PSK, 16QAM and 64QAM with respect to the interleaved bits. As a modulation order increases, the number of bits in one modulation symbol increases. Particularly in a higher-order modulation scheme greater than 8PSK, one modulation symbol includes three or more bits. In this case, bits mapped to one modulation symbol have different transmission reliabilities according to their positions.

With regard to transmission reliability, two bits of a modulation symbol representing a macro region defined by left/right and up/down have a relatively high reliability in an I (In Phase)-Q (Quadrature Phase) signal constellation. The other bits representing a micro region within the macro region have a relatively low reliability.

FIG. 2 illustrates an exemplary signal constellation in 16QAM. Referring to FIG. 2, one 16QAM modulation symbol contains 4 bits [i1, q1, i2, q2] in a reliability pattern [H, H, L, L] (H denotes high reliability and L denotes low reliability). That is, the two upper bits [i1, q1] have a relatively high reliability and the two lower bits [i2, q2], a relatively low reliability. One 64QAM modulation symbol contains 6 bits [i1, q1, i2, q2, i3, q3] in a reliability pattern [H, H, M, M, L, L] (M denotes medium reliability). Similarly, an 8PSK modulation symbol contains 3 bits. One of them has a lower reliability than the other two bits. Thus, a reliability pattern is [H, H, L].

Considering the above reliability patterns, it is preferable to map coded bits output from the channel encoder 110 to regions having different reliabilities according to their significance levels. As stated before, the coded bits are divided into systematic bits and parity bits having different priority levels. In other words, if errors are generated at different rates in a transport channel according to the reliabilities, a receiver can recover original bits more accurately by decoding when the parity bits have errors than when the systematic bits have errors because the systematic bits are actual information and the parity bits are error correction bits.

In this context, SMP (Symbol Mapping method based on Priority) has been proposed in which systematic bits are mapped to a high reliability region and parity bits are mapped to a low reliability region, so that the error rate of the relatively significant systematic bits can be decreased.

Aside from the different reliabilities of coded bits, each modulation symbol is transmitted with a different error rate on a radio channel in a modulation scheme having a modulation order equal to higher than 16QAM. For example, in the signal constellation for 16QAM, 4 coded bits form one modulation symbol and are mapped to one of 16 signal points. The 16 signal points are classified into three regions according to their error rates. As a modulation symbol is farther along a real or imaginary number axis, it has a lower error rate, which means that the receiver identifies the modulation symbol more easily.

FIG. 3 illustrates graphs showing the error probabilities of the regions in a simulation under an AWGN (Additive White Gaussian Noise) environment. As shown in FIG. 2, the 16 modulation symbols are classified into region 1 having a high error probability, region 2 having a medium error probability, and region 3 having a low error probability. For example, modulation symbols 6, 7, 10 and 11 in region 1 have a relatively high error probability.

In packet data retransmission by HARQ, therefore, retransmission with the same reliability and/or error probability as that of initial transmission does not increase retransmission efficiency. Retransmission of specific bits with a consistently low reliability and/or high error probability deteriorates decoding performance since a channel decoder being a turbo decoder has good decoding performance when the LLRs (Log Likelihood Ratios) of input bits are homogeneous. Therefore, there is a need for exploring a novel retransmission technique that improves transmission performance at retransmission.

Techniques for improving transmission performance at retransmission include SRRC (Shifted Retransmission for Reliability Compensation) and BIR (Bit Inverted Retransmission). In the SSRC, the coded bits of a modulation symbol are shifted by a predetermined number of bits, for example, two bits and thus mapped to different reliability parts at a retransmission from those at their initial transmission. In the BIR, the coded bits are inverted and thus mapped to different error probability parts at a retransmission from those at the initial transmission. Those techniques commonly comprise the LLRs of bits input to a turbo decoder and thus improve decoding performance.

To describe the SRRC in more detail, an M-ary modulation symbol includes $\log_2 M$ bits having different reliabilities. For example, four coded bits form one modulation symbol with the two upper bits mapped to a high reliability and the two lower bits mapped to a low reliability in 16QAM, as illustrated in FIG. 2. Two-bit cyclic shifting of the coded bits of each modulation symbol at a retransmission effects averaging the transmission reliabilities of the coded bits, thereby improving decoding performance.

With regard to the BIR, 16 modulation symbols each having 4 coded bits are classified into region 1 having a relatively high error probability, region 3 having a relatively low error probability, and region 2 having a medium probability in 16QAM, as illustrated in FIG. 2. Inversion of the coded bits of each modulation symbol prior to symbol mapping at a retransmission also effects averaging the error probabilities of the coded bits and thus improves system performance at decoding.

Despite the advantage of improved system performance, however, a simple combined use of the above techniques is not effective in their application to systems. Therefore, the techniques need to be combined effectively so that optimum transmission efficiency can be achieved in a CDMA mobile communication system.

SUMMARY OF THE INVENTION

It is, therefore, an object of the present invention to provide in a wireless communication system a transmitting/receiving apparatus and method in which packet retransmission is carried out with system performance increased.

It is another object of the present invention to provide in a wireless communication system a transmitting/receiving apparatus and method that increase the reliabilities of bits at a packet retransmission.

It is also another object of the present invention to provide in a wireless communication system a transmitting/receiving apparatus and method for enabling a receiver to receive bits with a higher reception probability.

It is a further object of the present invention to provide a wireless communication system supporting HARQ a transmitting/receiving apparatus and method for more efficient packet retransmission.

It is still another object of the present invention to provide an apparatus and method for efficiently combining an initial transmission technique with a retransmission technique.

It is yet another object of the present invention to provide an apparatus and method for simultaneously supporting the BIR with the SRRC.

To achieve the above and other objects, according to one aspect of the present invention, upon request for a retransmission from a receiver, a transmitter generates first coded bits by inverting initially transmitted coded bits, generates second coded bits by separating the initially transmitted coded bits into a first bit group having a relatively high priority and a second bit group having a relatively low priority and exchanging the first bit group with the second bit group, and generates third coded bits by inverting the exchanged coded bits. The transmitter selects one of the first coded bits, the second coded bits (according to the sequence number of a retransmission request received from the receiver), and the third coded bits, and maps the selected coded bits to modulation symbols. The transmitter then transmits the modulation symbols to the receiver.

According to another aspect of the present invention, upon request for a retransmission from a receiver, a transmitter generates first coded bits by inverting initially transmitted coded bits, generates second coded bits by cyclically shifting the initially transmitted coded bits by a predetermined number of bits, and generates third coded bits by inverting the shifted coded bits. The transmitter selects one of the first coded bits, the second coded bits (according to the sequence number of a retransmission request received from the receiver), and the third coded bits, and maps the selected coded bits to modulation symbols. The transmitter then transmits the modulation symbols to the receiver.

BRIEF DESCRIPTION OF THE DRAWINGS

The above and other objects, features and advantages of the present invention will become more apparent from the following detailed description when taken in conjunction with the accompanying drawings in which:

FIG. 9 illustrates bit inversion in the transmitter according to an embodiment of the present invention;

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

HARQ, to which the present invention, is applied is a link controlling technique for correcting packet errors by retransmission. As is applied from its name, retransmission is one more transmission of initially transmitted but failed packet data. Therefore, new data is not transmitted at a retransmission.

As described before, HARQ techniques are divided into HARQ type II and HARQ type III depending on whether systematic bits are retransmitted or not. The major HARQ type II is FIR, and HARQ type III includes CC and PIR which are discriminated according to whether the same parity bits are retransmitted.

The present invention as described below is applied to all of the above HARQ techniques. In the CC, a retransmission packet has the same bits as an initial transmission packet, and in the FIR and PIR a retransmission packet and an initial transmission packet have different bits. Since the present invention pertains to a method of increasing the transmission efficiency of a retransmission packet, it is obviously applicable to the case where an initial transmission packet is different from its retransmission packet. Yet, the following description is made in the context of the CC by way of example.

The present invention can be implemented in two embodiments. In a first embodiment, SMP (Symbol Mapping method based on Priority) is combined with the BIR, and in a second embodiment, the SRRC is combined with the BIR.

First Embodiment: SMP+BIR

Figure 4:
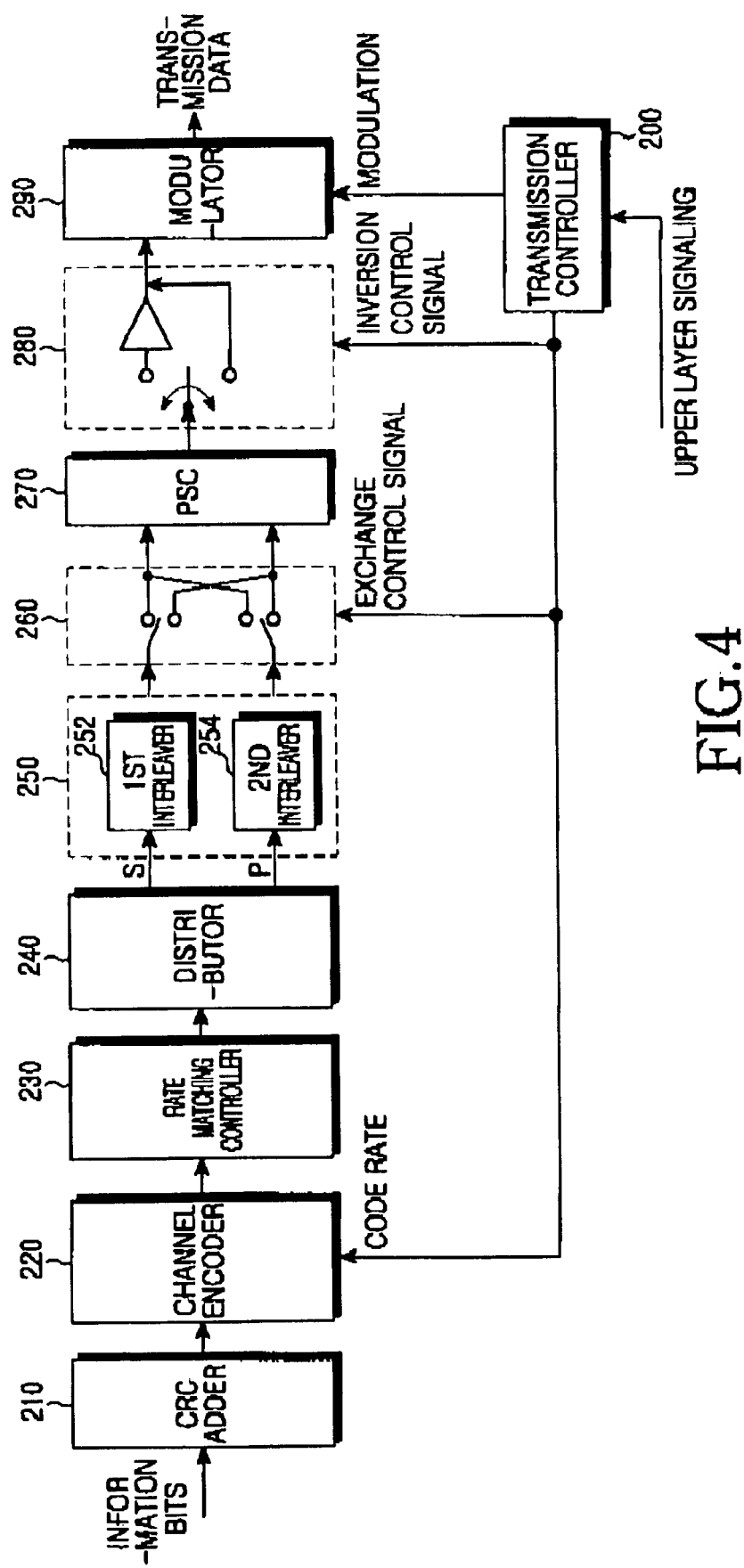
FIG. 4 is a block diagram of a transmitter in a CDMA mobile communication system according to an embodiment of the present invention.

FIG. 4 is a block diagram of a transmitter in a CDMA mobile communication system according to an embodiment of the present invention. Referring to FIG. 4, the transmitter includes a CRC (Cyclic Redundancy Check) adder 210, a channel encoder 220, a rate matching controller 230, a distributor 240, an interleaver unit 250, an exchange 260, a parallel-to-serial converter (PSC) 270, a bit inverter 280, a modulator 290, and a transmission controller 200.

The transmitter exchanges systematic bits with parity bits at a retransmission when necessary. Therefore, the exchange 260 is optional.

Referring to FIG. 4, the CRC adder 210 adds CRC bits to input information bits for an error check on a packet data basis. The channel encoder 220 encodes the packet data with the CRC bits at a predetermined code rate by predetermined coding.

The packet data is coded to systematic bits and parity bits being error control bits for the systematic bits. Turbo coding or convolutional coding can be used.

The code rate determines the ratio of the parity bits to the systematic bits. With a code rate of ½, for example, the channel encoder 220 outputs one systematic bit and one parity bit for the input of one information bit. With a code rate of ¾, the channel encoder 220 outputs three systematic bits and one parity bit for the input of three information bits. In the embodiment of the present invention, other code rates can also be applied aside from ½ and ¾.

The rate matching controller 230 matches the data rate of the coded bits by repetition and/or puncturing. The distributor 240 separates the rate-matched bits into systematic bits and parity bits and feeds the systematic bits to a first interleaver 252 and the parity bits to a second interleaver 254. With a symmetrical code rate such as ½, the first and second interleavers 252 and 254 receive the same number of bits. On the other hand, with an asymmetrical code rate such as ¾, systematic bits are first fed to the first interleaver 252 and the remaining systematic bits and the parity bits are then fed to the second interleaver 254.

The first interleaver 252 interleaves the systematic bits and the second interleaver 254 interleaves the parity bits in a predetermined interleaving method. While the first and second interleavers 252 and 254 are discriminated in hardware in FIG. 4, they can also be discriminated logically. This means that the interleaver unit 250 uses a single memory having a memory area for storing systematic bits and a memory area for storing parity bits. The thus-constituted interleaver unit 250 operates to map the systematic bits and the parity bits to different reliability parts. In other words, the SMP is achieved with the use of the distributor 240 and the interleaver unit 250.

The interleaver outputs are stored in a buffer (not shown) for use at retransmission. Upon request of a receiver for a retransmission, the whole or part of the buffered bits are output under the control of the transmission controller 200.

The coded bits, of which the sequences have been permuted by the first and second interleavers 252 and 254, are exchanged in the exchange 260 under the control of the transmission controller 200. At an initial transmission, the transmission controller 200 disables the exchange 260 so that the first interleaver output and the second interleaver output bypass the exchange 260. At a retransmission, the transmission controller 200 determines whether to enable the exchange 260 according to the number of retransmission occurrences. For example, bit exchange occurs at each third or fourth retransmission, and no bit exchange occurs at each first or second retransmission.

The coded bits that have passed through the exchange 260 are converted to a serial bit stream in the PSC 270. The bit inverter 280 inverts the bits of the serial bit stream under the control of the transmission controller 200. The transmission controller 200 enables or disables the bit inverter 280 according to the sequence number of a retransmission. For example, the bit inverter 280 inverts the coded bits only at each odd-numbered retransmission. The bit inverter 280 is an inverter that inverts input bits 0 or 1.

When bit inversion is not needed, the input coded bits bypass the bit inverter 280. This bit inverter 280 functions to map coded bits to a modulation symbol with a different error probability at a retransmission from that at an initial transmission, to thereby implement the BIR.

The modulator 290 modulates input coded bits in a predetermined modulation scheme. In 16QAM, the modulator 290 maps every four input coded bits to a modulation symbol having a bit reliability pattern [H, H, L, L]. H denotes a high reliability part and L denotes a low reliability part.

The transmission controller 200 provides overall control to the components of the transmitter in accordance with upper layer signaling. The transmission controller 200 determines the code rate of the channel encoder 220 and the modulation scheme of the modulator 290 according to the current radio channel condition.

The transmission controller 200 also controls the exchange 260 and the bit inverter 280 by a retransmission request from an upper layer in response for a retransmission request from a receiver. The retransmission request information from the upper layer indicates whether the receiver has requested a packet retransmission and how many times retransmission has been carried out so far.

Aside from the sequence number of a retransmission, the bit inverter 280 is enabled or disabled according to an SFN (System Frame Number). In this case, the transmitter can determine whether to perform bit inversion or not using the SFN only without the need for additional information such as the sequence number of a retransmission. This is because modulation without inversion at an initial transmission and inversion prior to modulation at a retransmission is equivalent to inversion prior to modulation at an initial transmission and modulation without inversion at a retransmission. That is, it does not matter whether bit inversion is performed at an initial transmission or at a retransmission in the present invention.

Figure 5:
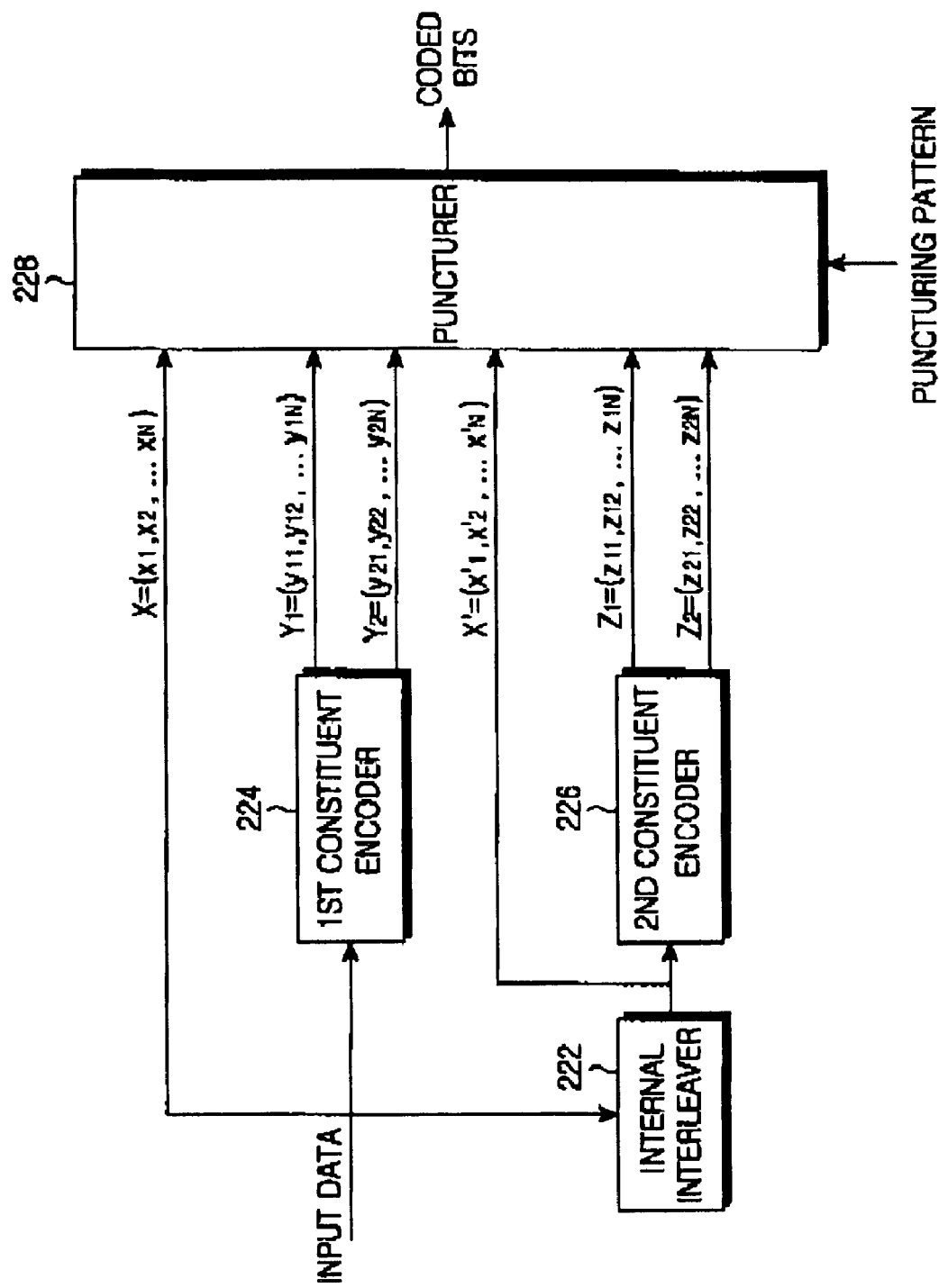
FIG. 5 is a detailed block diagram of a channel encoder illustrated in FIG. 4.

FIG. 5 is a detailed block diagram of the channel encoder 220 illustrated in FIG. 4. It is assumed that the channel encoder 220 uses a mother code rate of ⅙ adopted in the 3GPP (3$^{rd}$ Generation Partnership Project) standards.

Referring to FIG. 5, the channel encoder 220 simply outputs one data frame of size N as a systematic bit frame X ($=x_1, x_2, \ldots, x_N$). Here, N is determined according to the code rate. A first constituent encoder 224 outputs two different parity bit frames Y1 ($=y_{11}, y_{12}, \ldots, y_{1N}$) and Y2 ($=y_{21}, y_{22}, \ldots, y_{2N}$) for the input of the data frame.

An internal interleaver 222 interleaves the data frame and outputs an interleaved systematic bit frame X' ($=x'_1, x'_2, \ldots, x'_N$). A second constituent encoder 226 encodes the interleaved systematic bit frame X' to two different parity bit frames Z1 ($=z_{11}, z_{12}, \ldots, z_{1N}$) and Z2 ($=z_{21}, z_{22}, \ldots, z_{2N}$).

A puncturer 228 generates intended systematic bits S and parity bits P by puncturing the systematic bit frame X, the interleaved systematic bit frame X', and the parity bit frames Y1, Y2, Z1 and Z2 in a puncturing pattern received from the controller 270.

The puncturing pattern is determined according to the code rate of the channel encoder 220 and an H-ARQ method used. For example, when the code rate is ½, puncturing patterns available in H-ARQ type III (CC and PIR) are as follows.

$$P_1 = \begin{bmatrix} 1 & 1 \\ 1 & 0 \\ 0 & 0 \\ 0 & 0 \\ 0 & 0 \\ 0 & 1 \end{bmatrix} \quad (1)$$

$$P_2 = \begin{bmatrix} 1 & 1 \\ 1 & 0 \\ 0 & 0 \\ 0 & 0 \\ 0 & 1 \\ 0 & 0 \end{bmatrix} \quad (2)$$

where 1 indicates a transmission bit and 0 indicates a punctured bit. Input bits are punctured from the left column to the right column.

One of the above puncturing patterns is used at an initial transmission and retransmissions in the CC, while they are alternately used at each transmission in the PIR.

In HARQ type II (FIR), systematic bits are punctured at retransmission. In this case, a puncturing pattern is "010010", for example.

In the CC, if the puncturing pattern $P_1$ (i.e., "110000" and "100001") is used, the puncturer 228 outputs bits X, Y1, X and Z2 with the other bits punctured at each transmission. If the puncturing pattern $P_2$ (i.e., "110000" and "100010") is used, the puncturer 228 outputs bits X, Y1, X and Z1 with the other bits punctured at each transmission.

In the PIR, the puncturer 228 outputs bits X, Y1, X and Z2 at an initial transmission and bits X, Y1, X and Z1 at a retransmission.

Though not shown, a channel encoder using a mother code rate of ⅓ adopted in the 3GPP2 is realized using one constituent encoder and a puncturer.

Figure 6:
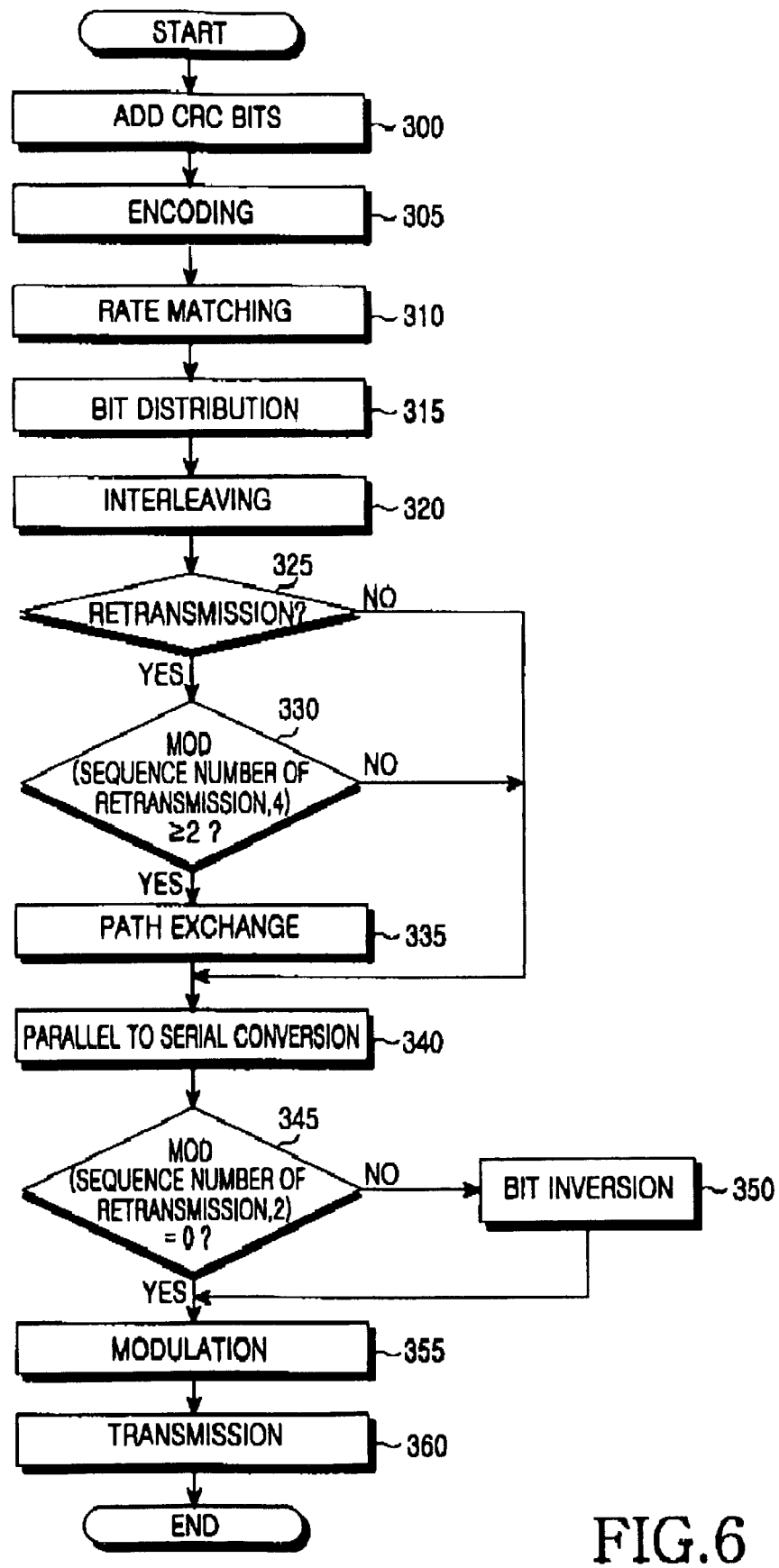
FIG. 6 is a flowchart illustrating the operation of the transmitter in the CDMA mobile communication system according to an embodiment of the present invention.

FIG. 6 is a flowchart illustrating the operation of the transmitter according to the embodiment of the present invention. Referring to FIG. 6, the CRC adder 210 adds CRC bits to input data on a packet basis in step 300 and the channel encoder 220 encodes the packet data with the CRC bits at a code rate preset between the transmitter and the receiver in step 305.

Specifically, the input packet data is simply output as a systematic bit frame X in the channel encoder 220. The first constituent channel encoder 224 encodes the systematic bit frame X at a predetermined code rate and outputs different parity bit frames Y1 and Y2.

The internal interleaver 222 interleaves the packet data and outputs another systematic bit frame X'. The second constituent channel encoder 226 encodes the systematic bit frame X' and outputs two different parity bit frames Z1 and Z2.

The puncturer 228 punctures the systematic bit frames X and X' and the parity bit frames Y1, Y2, Z1 and Z2 according to a desired code rate in a predetermined puncturing pattern.

As described before, the same puncturing pattern is used at an initial transmission and retransmissions in the CC. The puncturing pattern is stored in the puncturer 228 or received from the transmission controller 200. In FIG. 5, the puncturing pattern is illustrated to be externally received.

In step 310, the rate matching controller 230 matches the rate of the coded bits by repetition and puncturing. The rate matching controller 230 operates for transport channel multiplexing, or when the number of encoder output bits is different from the number of bits in a transmission frame.

In step 315, the distributor 240 separates the rate-matched bits into systematic bits and parity bits. If the number of the systematic bits are equal to that of the parity bits, the systematic bits and the parity bits are fed to the first and second interleavers 252 and 254, respectively. On the other hand, if they are different, the first interleaver 252 first receives systematic bits. The first and second interleavers 252 and 254 interleave the input coded bits in step 320.

The transmission controller 200 determines in step 325 whether a retransmission request command received from the upper layer indicates the initial transmission of a new packet or a retransmission of a previous packet. In the case of the initial transmission of the new packet, the procedure goes to step 340.

In the case of a retransmission of the same packet, the transmission controller 200 calculates MOD (the sequence number of the retransmission, $\log_2 M$) in step 330. MOD denotes a modulo operation and M indicates the modulation order used in the modulator 290. If the solution is less than 2, the procedure jumps to step 340. On the other hand, if the solution is equal to or greater than 2, the transmission controller 200 enables the exchange 260. The exchange 260 then exchanges in step 335 the outputs of the first and second interleavers 252 and 254. As a result, the systematic bits are fed to the second interleaver 254, and the parity bits to the first interleaver 252.

In step 340, the PSC 270 converts the coded bits received in two paths to a serial bit stream. The transmission controller 200 in step 345 calculates MOD (the sequence number of the retransmission, 2) to determine whether to invert the bits of the serial bit stream. If the solution is 0, this indicates an even-numbered retransmission and if the solution is not 0, this indicates an odd-numbered retransmission. In the former, the transmission controller 200 disables the bit inverter 280, and in the latter, it enables the bit inverter 280. When enabled, the bit inverter 280 inverts in step 350 the bits of the serial bit stream. On the contrary, when the bit inverter is disabled, the serial bit stream is directly fed to the modulator 290 without bit inversion.

The modulator 290 maps the input bits to symbols in step 355. In 16QAM, every four coded bits are mapped to a modulation symbol having a reliability pattern [H, H, L, L]. The modulation symbols are spread with a predetermined spreading code and transmitted to the receiver in step 360.

Figure 7:
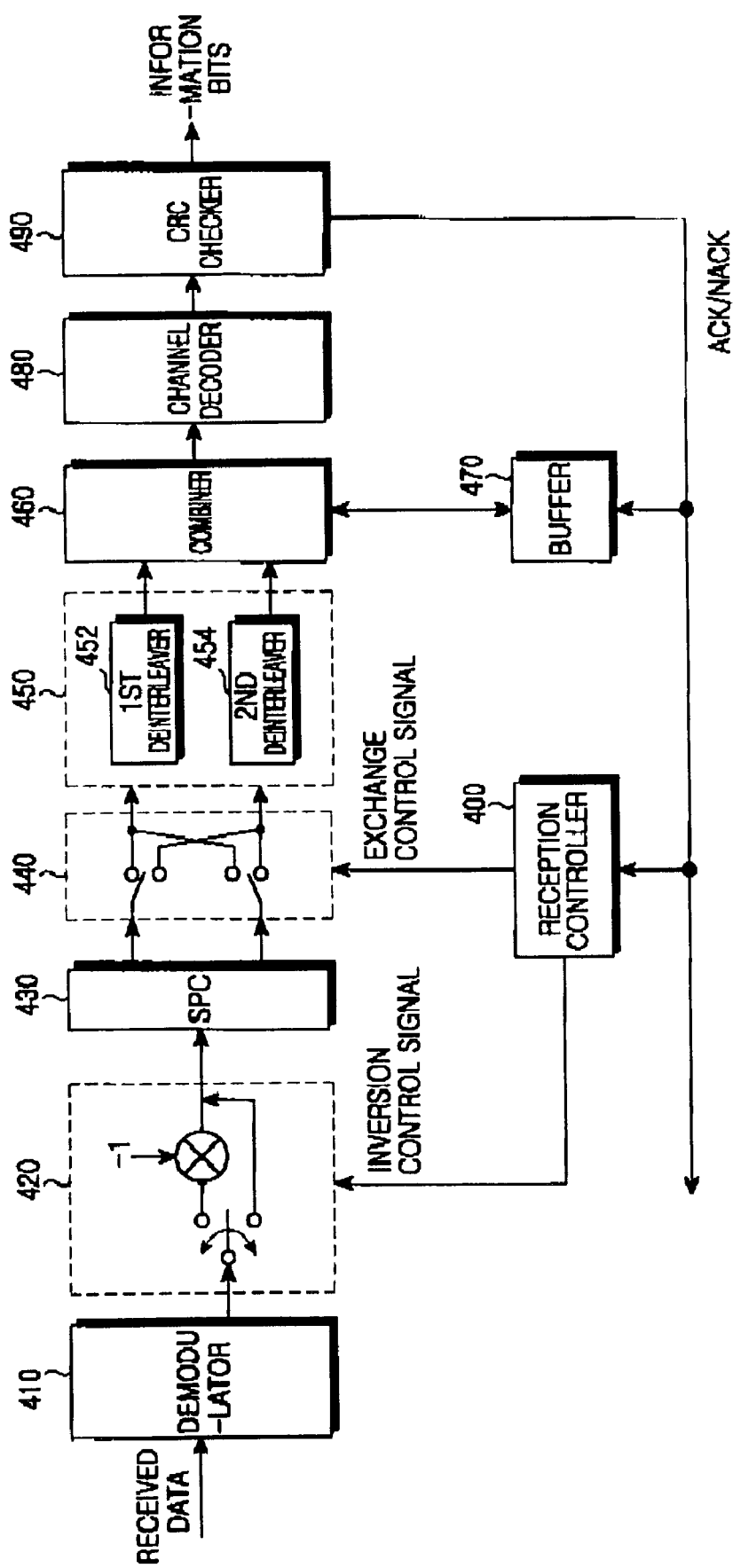
FIG. 7 is a block diagram of a receiver for receiving signals from the transmitter illustrated in FIG. 4 in the CDMA mobile communication system according to the embodiment of the present invention.

FIG. 7 is a block diagram of a receiver being the counterpart of the transmitter illustrated in FIG. 4 according to an embodiment of the present invention. Referring to FIG. 7, the receiver includes a demodulator 410, a bit inverter 420, a serial-to-parallel converter (SPC) 430, an exchange 440, a deinterleaver unit 450, a combiner 460, a buffer 470, a channel decoder 480, a CRC checker 490, and a reception controller 400.

In operation, the demodulator 410 demodulates data received from the transmitter in a demodulation method corresponding to the modulation scheme used in the modulator 290. The bit inverter 420 inverts the bits of the demodulated symbols under the control of the reception controller 400. The reception controller 400 enables the bit inverter 420 only at each odd-numbered retransmission.

The bit inverter 420 is a multiplier that selectively multiplies −1 by input bits because demodulated bits output from the demodulator 410 have soft values −1 and 1. That is, the multiplier converts 1 to −1 and −1 to 1 by sign inversion. Specifically, the multiplier multiplies −1 by input bits at each odd-numbered retransmission of the same packet under the control of the reception controller 400. Thus, the multiplier performs the same function as the inverter illustrated in FIG. 4. If the demodulator 410 outputs coded bits expressed in hard values 0 and 1, the multiplier must be replaced with an inverter.

The SPC 430 converts the coded bits received from the bit inverter 420 to two parallel bit streams under the control of the reception controller 400. If the solution of MOD (the sequence number of a retransmission, $\log_2 M$) is less than 2, the reception controller 400 disables the exchange 440. Then the two parallel coded bit streams are directly fed to the deinterleaver. If the solution of MOD (the sequence number of a retransmission, $\log_2 M$) is equal to or greater than 2, the reception controller 400 enables the exchange 400 and the exchange 440 exchanges the two parallel coded bit streams with each other.

One of the parallel coded bit streams is fed to a first deinterleaver 452 and the other coded bit stream, to a second deinterleaver 454. The first and second deinterleavers 452 and 454 deinterleave the input coded bits in a deinterleaving rule corresponding to the interleaving rule used in the first and second interleavers 252 and 254 of the transmitter.

The combiner 460 combines the current received coded bits of a packet with the coded bits of the same packet accumulated in the buffer 470. If there are no coded bits of the same packet in the buffer 470, that is, in the case of initial transmission, the combiner 460 simply outputs the current received coded bits and simultaneously stores them in the buffer 470.

The channel decoder 480 recovers the coded bits received from the combiner 460 by decoding them in a predetermined decoding method, turbo decoding here corresponding to the coding method in the channel encoder 220 of the transmitter.

The CRC checker 490 extracts CRC bits from the decoded information bits on a packet basis and determines whether the packet has errors using the extracted CRC bits. An upper layer processes the packet if the packet has no errors and an ACK (Acknowledgement) signal for the packet is transmitted to the transmitter. On the contrary, if the packet has errors, an NACK (Non-Acknowledgement) signal for the packet is transmitted to the transmitter, requesting a retransmission of the packet.

If the ACK signal is transmitted to the transmitter, the buffer 470 is initialized with the coded bits of the corresponding packet deleted. If the NACK signal is transmitted to the transmitter, the coded bits of the packet remain in the buffer 470. The reception controller 400 counts transmissions of the NACK signal to determine the sequence number of the next retransmission and control the bit inverter 420 and the exchange 440 correspondingly.

Figure 8:
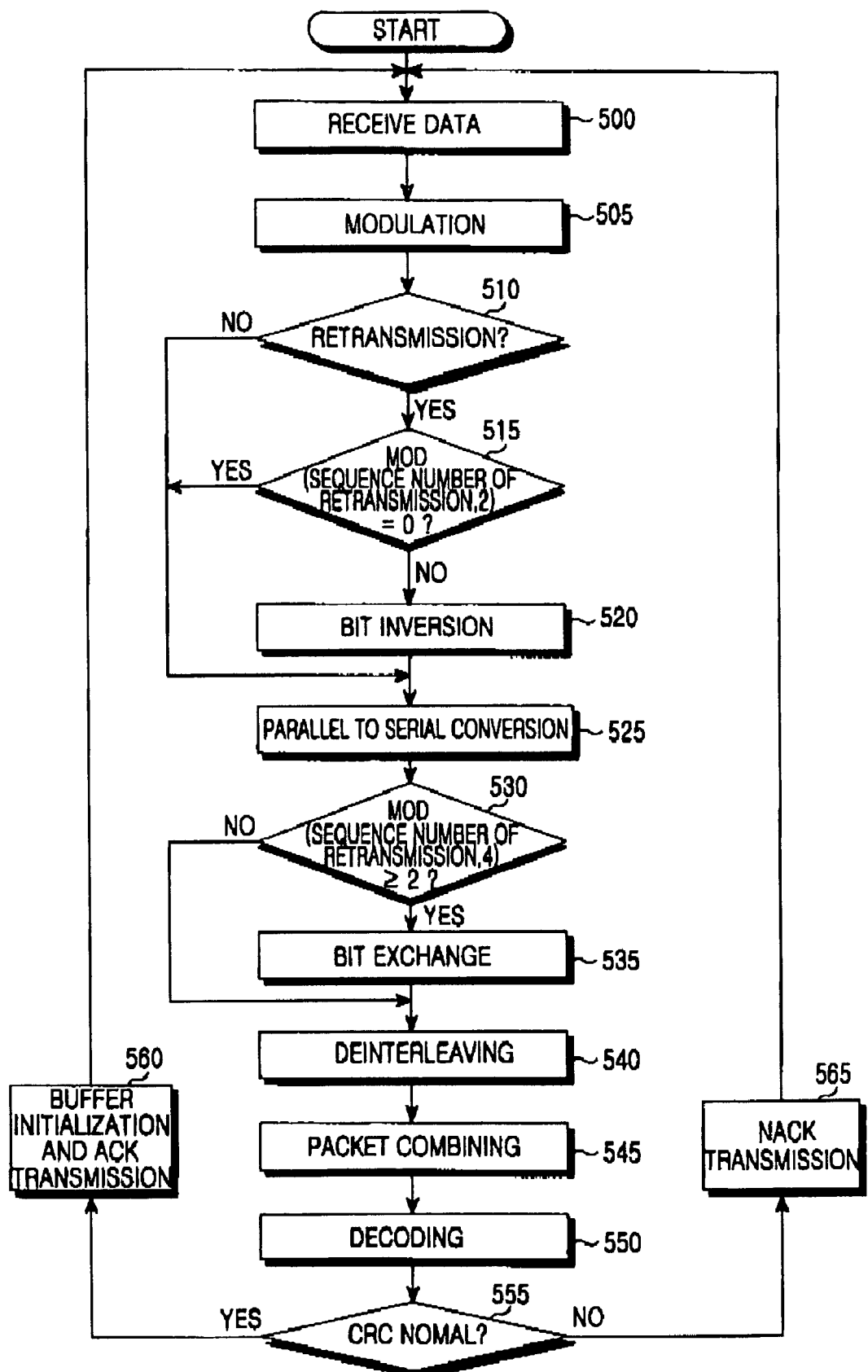
FIG. 8 is a flowchart illustrating the operation of the receiver in the CDMA mobile communication system according to an embodiment of the present invention.

FIG. 8 is a flowchart illustrating the operation of the receiver according to an embodiment of the present invention. Referring to FIG. 8, upon receipt of data on a radio transport channel in step 500, the demodulator 410 recovers coded bits by demodulating the received data on a modulation symbol basis according to a modulation scheme preset between the receiver and the transmitter in step 505. In step 510, the reception controller 400 determines whether the coded bits are an initial transmission packet or a retransmission packet.

In the case of retransmission, the reception controller 400 calculates MOD (the sequence number of the retransmission, 2) in step 515. If the solution is not 0, that is, if the retransmission is an odd-numbered one, the reception controller 400 enables the bit inverter 420. The bit inverter 420 then inverts the coded bits in step 520. On the other hand, in the case of initial transmission, the reception controller 400 disables the bit inverter 420 and the coded bits bypass the bit inverter 420.

Bit inversion will be described in more detail with reference to FIG. 9. FIG. 9 illustrates a 12-bit frame with a modulation order of 16. Here, one modulation symbol has 4 bits. Referring to FIG. 9, the first, second and third modulation symbols are [0000], [1100], and [0111], respectively. When an NACK signal is received and thus a retransmission is requested, the original bits are inverted. Thus, [0000], [1100] and [0111] are converted [1111], [0011] and [1000], respectively.

Figure 1:
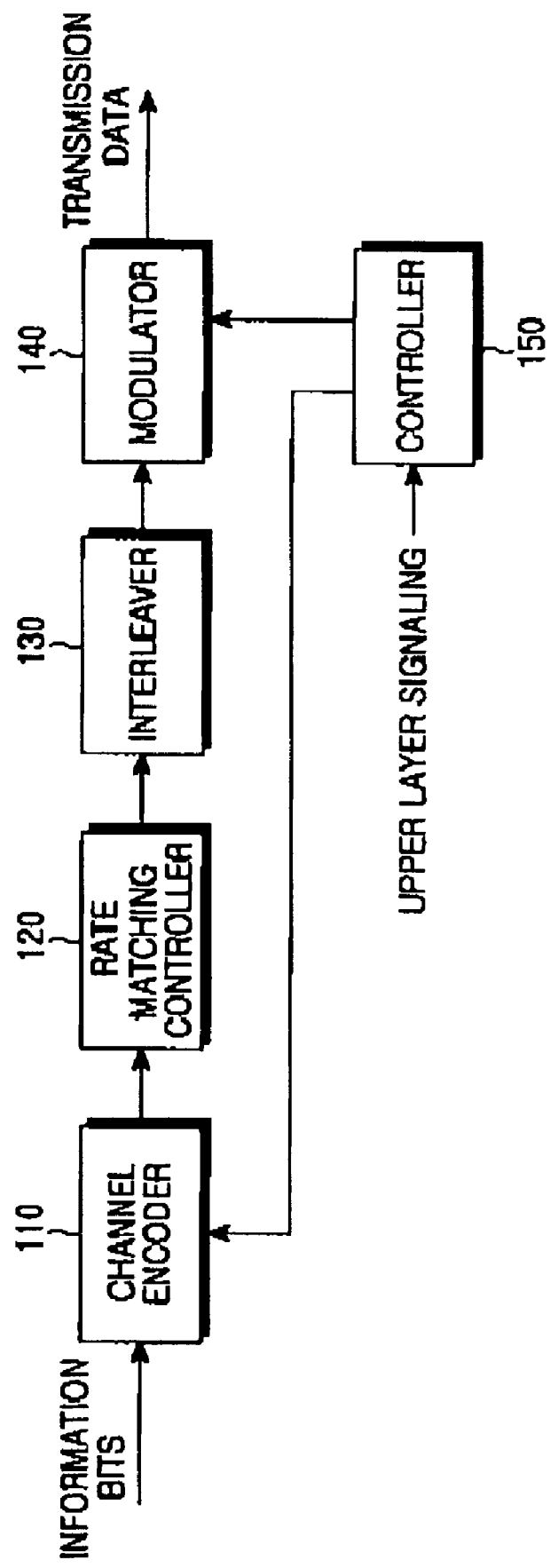
FIG. 1 is a block diagram of a transmitter in a typical CDMA mobile communication system.
Figure 2:
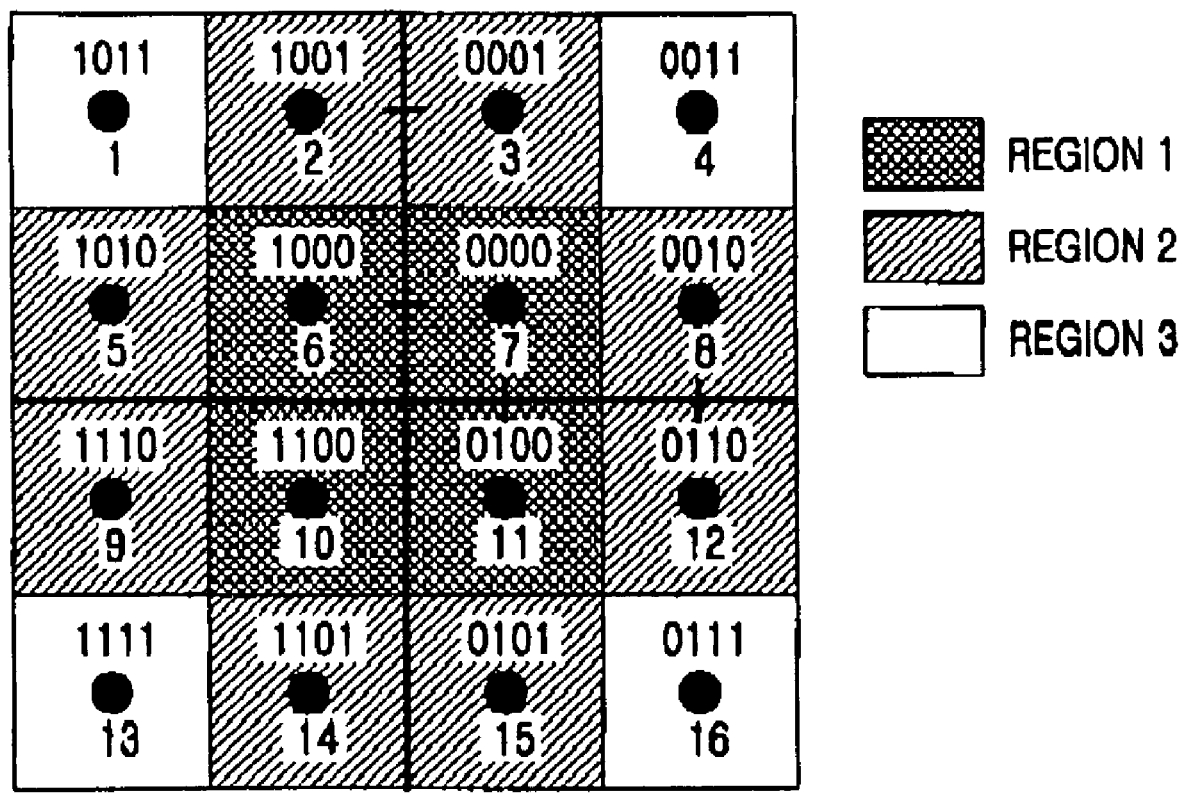
FIG. 2 illustrates an example of a signal constellation in 16QAM in the CDMA mobile communication system.
Figure 3:
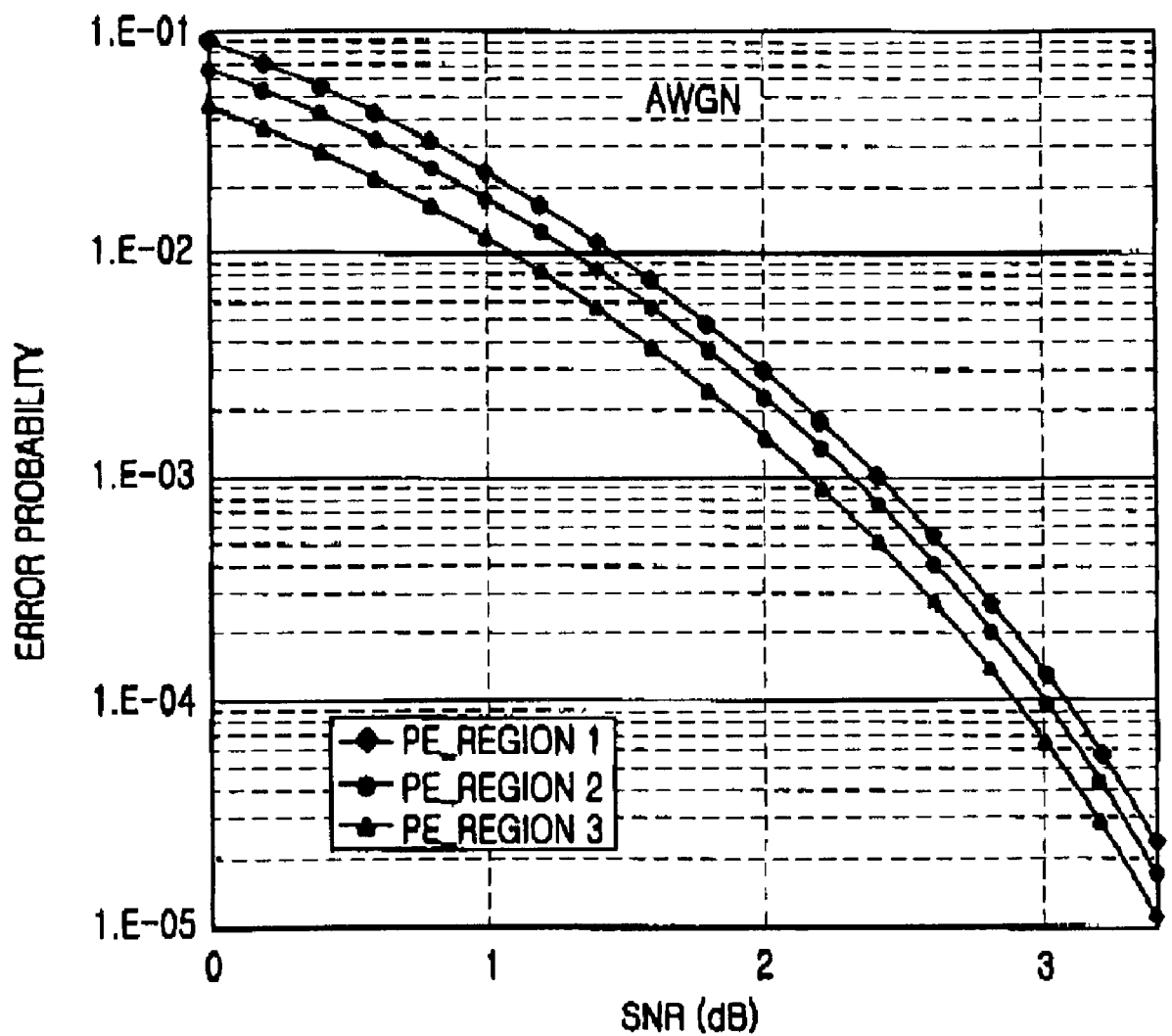
FIG. 3 illustrates the error probabilities of regions in the signal constellation of 16QAM.

In connection with the signal constellation of FIG. 2, the initial transmission modulation symbol [0000] in region 1 is retransmitted as [1111] in region 3. From the graphs of FIG. 3, it is noted that the error probability of region 1 is much higher than that of region 3. Transmission of a specific symbol consistently in a region with a high error probability adversely influences system performance. However, retransmission of a symbol in a different transmission region leads to averaging the error probabilities of bits and thus increases decoding performance according to the present invention.

Returning again to FIG. 8, coded bits that have passed through or bypassed the bit inverter 420 are separated into two parallel bit streams in the SPC 430 in step 525. The reception controller 400 calculates MOD (the sequence number of the retransmission, $\log_2 M$) in step 530. If the solution is less than 2, the reception controller 400 disables the exchange 440 and the parallel coded bit streams are directly fed to the deinterleaver 450. On the other hand, if the solution is equal to or greater than 2, the reception controller 400 enables the exchange 440 and the exchange 535 exchanges the two parallel coded bit streams with each other in step 440. The first and second deinterleavers 452 and 454 deinterleave the coded bit streams in two paths in step 540.

The combiner 460 in step 545 combines the deinterleaved coded bits with coded bits of the same packet accumulated in the buffer 470. In step 550, the channel decoder 480 decodes the combined bits in a decoding method preset between the transmitter and the receiver and outputs the original information bits.

In step 555, the CRC checker 490 determines whether the packet has errors by a CRC check on the decoded information bits on a packet basis. If the packet has no errors, the buffer 470 is initialized and an ACK signal is transmitted to the transmitter in step 560. Then the packet is provided to the upper layer.

On the contrary, if the packet has errors, the coded bits stored in the buffer 470 are preserved and an NACK signal requesting a retransmission of the packet is transmitted to the transmitter in step 565.

Packet retransmission with 16QAM used as a modulation scheme according to the embodiment of the present invention can be generalized as follows:

(1) coded bits are initially transmitted;

(2) the coded bits are inverted for modulation at a first retransmission;

(3) systematic bits are exchanged with parity bits prior to modulation at a second retransmission;

(4) the systematic bits are exchanged with the parity bits and then the coded bits are inverted prior to modulation at a third retransmission;

(5) the coded bits are modulated without modification in the same manner as at the initial transmission at a fourth retransmission; and (6) steps (1) to (5) are repeated upon request for the next retransmissions.

Second Embodiment: SRRC+BIR

Figure 10:
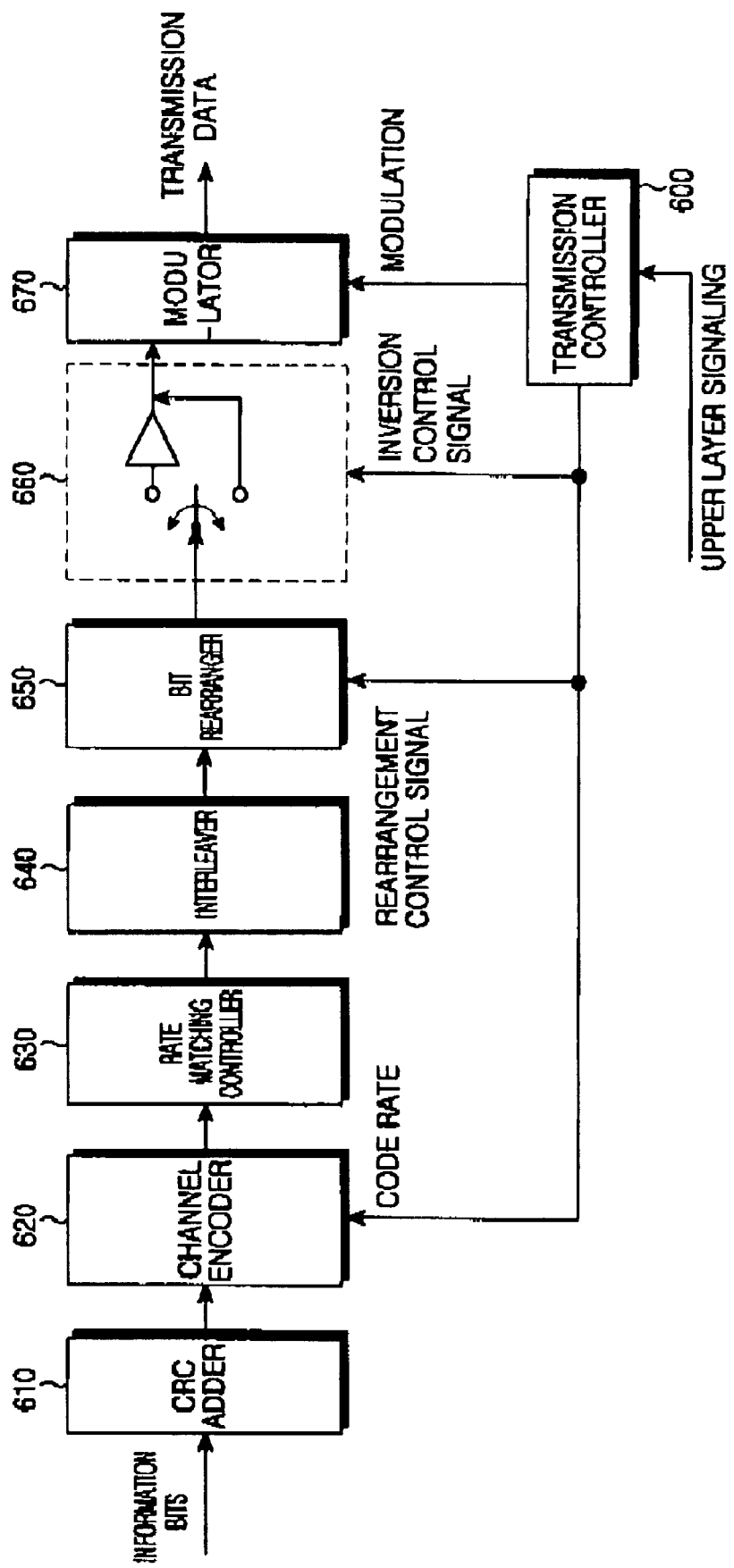
FIG. 10 is a block diagram of a transmitter in a CDMA mobile communication system according to a second embodiment of the present invention.

FIG. 10 is a block diagram of a transmitter in a CDMA mobile communication system according to another embodiment of the present invention. Referring to FIG. 10, the transmitter includes a CRC adder 610, a channel encoder 620, a rate matching controller 630, an interleaver 640, a bit rearranger 650, a bit inverter 660, a modulator 670, and a transmission controller 600. The transmitter shifts retransmission bits by a predetermined number of bits and inverts the shifted bits according to the sequence number of a retransmission.

Referring to FIG. 10, the CRC adder 610 adds CRC bits to input information bits for an error check on a packet data basis. The channel encoder 620 encodes the packet data with the CRC bits at a predetermined code rate by predetermined coding.

The packet data is coded to systematic bits and parity bits being error control bits for the systematic bits. Turbo coding or convolutional coding can be used. The detailed structure of the channel encoder 620 is illustrated in FIG. 5.

The code rate determines the ratio of the parity bits to the systematic bits. With a code rate of ½, for example, the channel encoder 620 outputs one systematic bit and one parity bit for the input of one information bit. With a code rate of ¾, the channel encoder 620 outputs three systematic bits and one parity bit for the input of three information bits. In the embodiment of the present invention, other code rates can also be applied aside from ½ and ¾.

The rate matching controller 630 matches the data rate of the coded bits by repetition or puncturing. The interleaver 640 interleaves the rate-matched bits and the interleaver output is stored in a buffer (not shown) for use at retransmission. Upon request of a receiver for a retransmission, the whole or part of the buffered bits are output under the control of the transmission controller 600.

The coded bits, of which the sequence has been permuted by the interleaver 640, are shifted in the bit rearranger 650 under the control of the transmission controller 600. The bit rearranger 650 includes a shifter for cyclically shifting input coded bits by a predetermined number of bits. The transmission controller 600 determines whether to rearrange coded bits at the bit rearranger 650 according to the sequence number of a retransmission and the bit rearranger 650 rearranges the coded bits when the transmission controller 600 commands bit rearrangement. The bit rearranger 650 implements the SRRC.

For example, the transmission controller 600 disables the bit rearranger 650 at each first or second retransmission, and enables the bit rearranger 650 at each third or fourth retransmission. In the former case, the coded bits bypass the bit rearranger 650, and in the latter case, the bit rearranger 650 cyclically shifts the coded bits by a predetermined number of, for example, two bits.

As described before, pairs of coded bits are mapped to different reliability parts in 16QAM or 64QAM. Hence the bit rearranger 650 cyclically shifts the coded bits of each modulation symbol by two bits so that the coded bits can be mapped to different reliability parts at a retransmission from those at an initial transmission.

If coded bits for initial transmission are [a, b, c, d] in 16QAM, the two upper bits [a, b] are mapped to a high reliability part and the two lower bits [c, d], to a low reliability part. At a retransmission, the coded bits [a, b, c, d] are converted to [c, d, a, b] by two-bit cyclic shifting. The two upper bits [c, d] are mapped to have a high reliability, and the two lower bits [a, b], to have a low reliability.

The bit inverter 660 inverts the coded bits that have passed through or bypassed the bit rearranger 650 under the control of the transmission controller 600. The transmission controller 600 enables or disables the bit inverter 660 according to the sequence number of a retransmission. For example, the bit inverter 660 inverts the coded bits only at each odd-numbered retransmission. The bit inverter 280 is an inverter that inverts input bits 0 or 1.

When bit inversion is not needed, the input coded bits bypass the bit inverter 660. This bit inverter 660 functions to map coded bits to a modulation symbol with a different error probability at a retransmission from that at an initial transmission.

The modulator 670 modulates input coded bits in a predetermined modulation scheme. In 16QAM, the modulator 670 maps every four input coded bits to a modulation symbol having a bit reliability pattern [H, H, L, L].

The transmission controller 600 provides overall control to the components of the transmitter according to the second embodiment of the present invention. The transmission controller 600 determines the code rate of the channel encoder 620 and the modulation scheme of the modulator 670 according to the current radio channel condition. The transmission controller 600 also processes a retransmission request from an upper layer that has received a retransmission request from a receiver and controls the bit rearranger 650 and the bit inverter 660 correspondingly.

The retransmission request information from the upper layer indicates whether the receiver has requested a packet retransmission and how many times retransmission has been carried out so far. At a retransmission of the same packet, the bit rearranger 650 is enabled only if MOD (the sequence number of the retransmission, $\log_2 M$) is equal to or greater than 2, and the bit inverter 660 is enabled only if MOD (the sequence number of the retransmission, 2) is 1.

Figure 11:
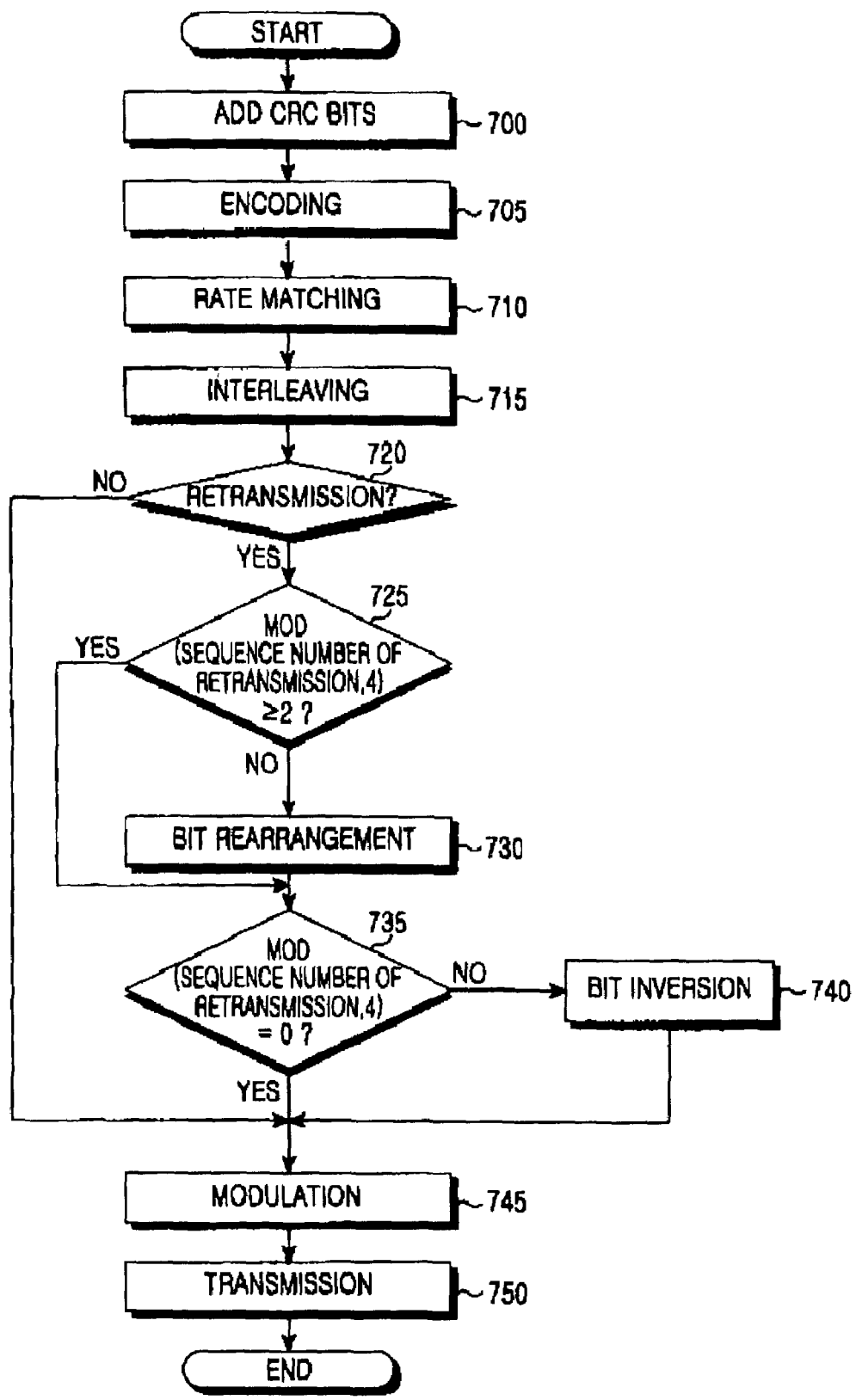
FIG. 11 is a flowchart illustrating the operation of the transmitter in the CDMA mobile communication system according to the second embodiment of the present invention.

FIG. 11 is a flowchart illustrating the operation of the transmitter according to the second embodiment of the present invention. Referring to FIG. 11, the CRC adder 610 adds CRC bits to input data on a packet basis in step 700 and the channel encoder 620 encodes the packet data with the CRC bits in step 705. In step 710, the rate matching controller 630 matches the rate of the coded bits by repetition or puncturing. The interleaver 640 interleaves the rate-matched bits in step 715.

In step 720, the transmission controller 600 determines whether a retransmission request command received from the upper layer indicates the initial transmission of a new packet or a retransmission of a previous packet. In the case of the initial transmission of the new packet, the procedure goes to step 745.

In the case of a retransmission of the same packet, the transmission controller 600 calculates MOD (the sequence number of the retransmission, $\log_2 M$) in step 725. If the solution is equal to or greater than 2, the procedure jumps to step 735. On the other hand, if the solution is less than 2, the transmission controller 600 enables the bit rearranger 650. The bit rearranger 650 then rearranges the interleaver output by two bit-cyclic shifting in step 730.

In step 735, the transmission controller 600 calculates MOD (the sequence number of the retransmission, 2) to determine whether to enable the bit inverter 660. If the solution is 0, this indicates an even-numbered retransmission and if the solution is not 0, this indicates an odd-numbered retransmission. In the former, the transmission controller 600 disables the bit inverter 660 and in the latter, it enables the bit inverter 660. When enabled, the bit inverter 660 inverts the coded bits in step 740. On the contrary, when the bit inverter 660 is disabled, the coded bits are directly fed to the modulator 670 without bit inversion.

The modulator 670 maps the input bits to symbols in step 745. In 16QAM, every four coded bits are mapped to a modulation symbol having a reliability pattern [H, H, L, L]. The modulation symbols are spread with a predetermined spreading code and transmitted to the receiver in step 750.

Figure 12:
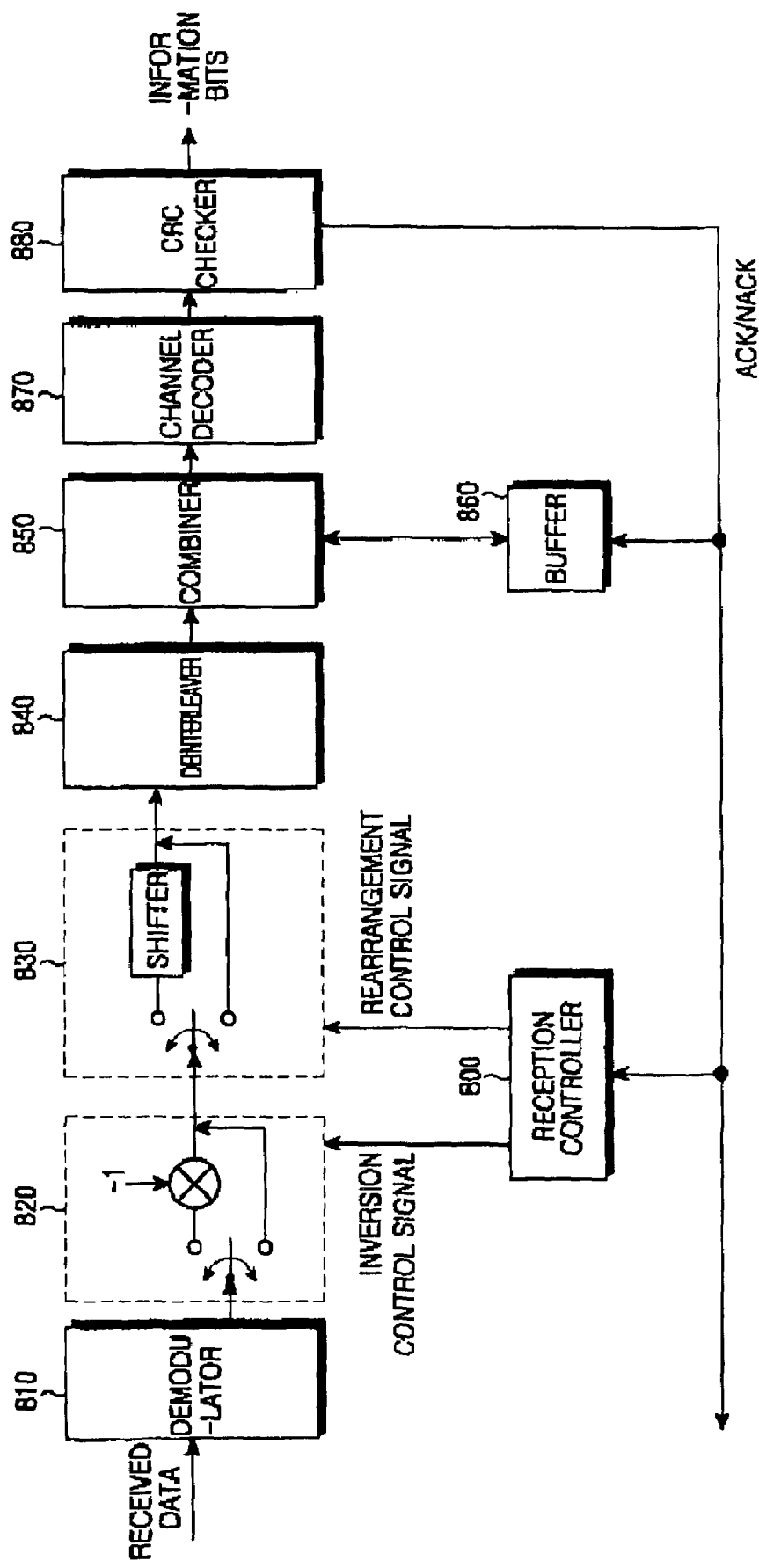
FIG. 12 is a block diagram of a receiver for receiving signals from the transmitter illustrated in FIG. 10 in the CDMA mobile communication system according to the second embodiment of the present invention.

FIG. 12 is a block diagram of a receiver being the counterpart of the transmitter illustrated in FIG. 10 according to the second embodiment of the present invention. Referring to FIG. 12, the receiver includes a demodulator 810, a bit inverter 820, a bit rearranger 830, a deinterleaver unit 840, a combiner 650, a buffer 860, a channel decoder 870, a CRC checker 880, and a reception controller 800.

In operation, the demodulator 810 demodulates data received from the transmitter in a demodulation method corresponding to the modulation scheme used in the modulator 670. The bit inverter 820 inverts the bits of the demodulated symbols under the control of the reception controller 800. The reception controller 800 enables the bit inverter 820 only at each odd-numbered retransmission.

The bit inverter 820 is a multiplier that multiplies −1 by input bits selectively. Specifically, the multiplier multiplies −1 by input bits at each odd-numbered retransmission of the same packet under the control of the reception controller 800. Thus, the multiplier performs the same function as the inverter illustrated in FIG. 10. If the demodulator 810 outputs coded bits expressed in hard values 0 and 1, the multiplier is replaced with an inverter.

The bit rearranger 830 rearranges the coded bits received from the bit inverter 820 under the control of the reception controller 800. If the solution of MOD (the sequence number of a retransmission, $\log_2 M$) is less than 2, the reception controller 800 disables the bit rearranger 830. Then the coded bit streams are directly fed to the deinterleaver 840. If the solution of MOD (the sequence number of a retransmission, $\log_2 M$) is equal to or greater than 2, the reception controller 800 enables the bit rearranger 830 and the bit rearranger 830 rearranges the coded bits by reverse cyclic shifting in correspondence to the bit rearrangement in the transmitter.

The deinterleaver 840 deinterleaves the input coded bits in a deinterleaving rule corresponding to the interleaving rule used in the interleaver 640 of the transmitter. The combiner 850 combines the current received coded bits of a packet with the coded bits of the same packet accumulated in the buffer 860. If there are no coded bits of the same packet in the buffer 860, that is, in the case of initial transmission, the combiner 850 simply outputs the current received coded bits and simultaneously stores them in the buffer 860.

The channel decoder 870 recovers the coded bits received from the combiner 850 by decoding them in a predetermined decoding method corresponding to the coding method in the channel encoder 620 of the transmitter. By decoding, systematic bits are decoded for the input of the systematic bits and parity bits.

The CRC checker 880 extracts CRC bits from the decoded information bits on a packet basis and determines whether the packet has errors using the extracted CRC bits. If the packet has no errors, an ACK signal for the packet is transmitted to the transmitter. On the contrary, if the packet has errors, an NACK (Non-Acknowledgement) signal for the packet is transmitted to the transmitter, requesting a retransmission of the packet.

If the ACK signal is transmitted to the transmitter, the buffer 860 is initialized with the coded bits of the corresponding packet deleted. If the NACK signal is transmitted to the transmitter, the coded bits of the packet remain in the buffer 870. The reception controller 800 counts transmissions of the NACK signal to determine the sequence number of the next retransmission and control the bit inverter 820 and the bit rearranger 830 correspondingly.

Figure 13:
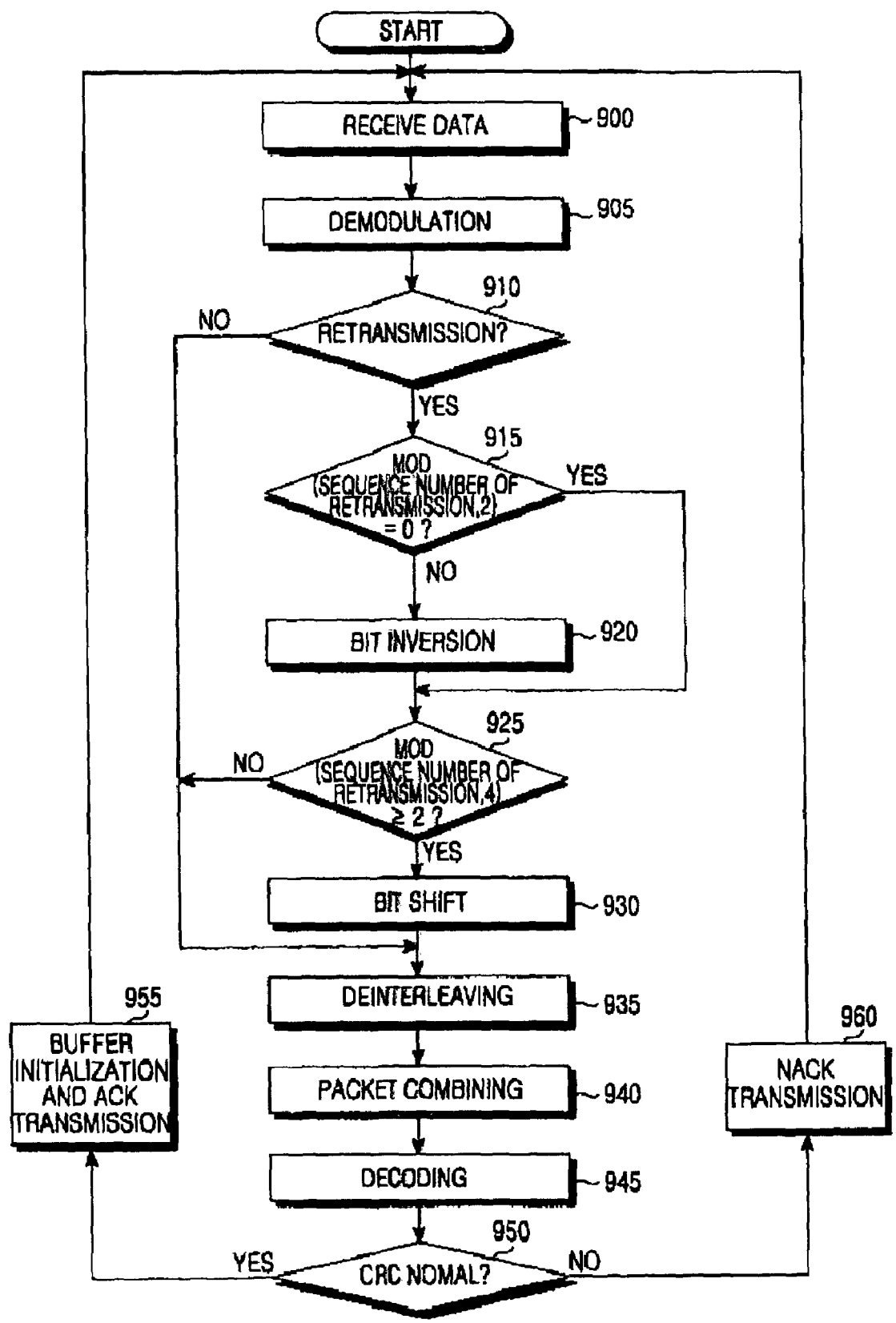
FIG. 13 is a flowchart illustrating the operation of the receiver in the CDMA mobile communication system according to the second embodiment of the present invention.

FIG. 13 is a flowchart illustrating the operation of the receiver according to the second embodiment of the present invention. Referring to FIG. 13, upon receipt of data on a radio transport channel in step 900, the demodulator 810 recovers coded bits by demodulating the received data on a modulation symbol basis according to a modulation scheme preset between the receiver and the transmitter in step 905. In step 910, the reception controller 800 determines whether the coded bits are an initial transmission packet or a retransmission packet. In the case of initial transmission, the reception controller 800 disables the bit inverter 820 and the coded bits bypass the bit inverter 820.

In the case of retransmission, the reception controller 800 calculates MOD (the sequence number of the retransmission, 2) in step 915. If the solution is not 0, that is, if the retransmission is an odd-numbered one, the reception controller 800 enables the bit inverter 820. The bit inverter 820 then inverts the coded bits in step 920.

In step 925, the reception controller 800 calculates MOD (the sequence number of the retransmission, $\log_2 M$). If the solution is less than 2, the reception controller 800 disables the bit rearranger 830 and the coded bits are directly fed to the deinterleaver 840. On the other hand, if the solution is equal to or greater than 2, the reception controller 800 enables the bit rearranger 830 and the bit rearranger 830 rearranges the coded bits by reverse cyclic shifting in correspondence to the bit rearrangement in the bit rearranger 650 of the transmitter in step 930.

The deinterleaver 840 deinterleaves the input coded bits in a deinterleaving method corresponding to the interleaving in the interleaver 640 in step 935, and the combiner 850 combines the deinterleaved coded bits with coded bits of the same packet accumulated in the buffer 860 in step 940. In step 945, the channel decoder 870 decodes the combined bits in a decoding method preset between the transmitter and the receiver and outputs the original information bits.

In step 950, the CRC checker 880 determines whether the packet has errors by a CRC check on the decoded information bits on a packet basis. If the packet has no errors, the buffer 860 is initialized and an ACK signal is transmitted to the transmitter in step 955. Then the packet is provided to the upper layer. On the contrary, if the packet has errors, the coded bits stored in the buffer 860 are preserved and an NACK signal requesting a retransmission of the packet is transmitted to the transmitter in step 960.

Packet retransmission with 16QAM used as a modulation scheme according to the second embodiment of the present invention can be generalized as follows:

(1) coded bits are initially transmitted;

(2) the coded bits are inverted for modulation at a first retransmission;

(3) the coded bits are shifted by two bits prior to modulation at a second retransmission;

(4) the coded bits are shifted by two bits and then inverted prior to modulation at a third retransmission;

(5) the coded bits are modulated without modification in the same manner as at the initial transmission at a fourth retransmission; and (6) steps (1) to (5) are repeated upon request for the next retransmissions.

Figure 14:
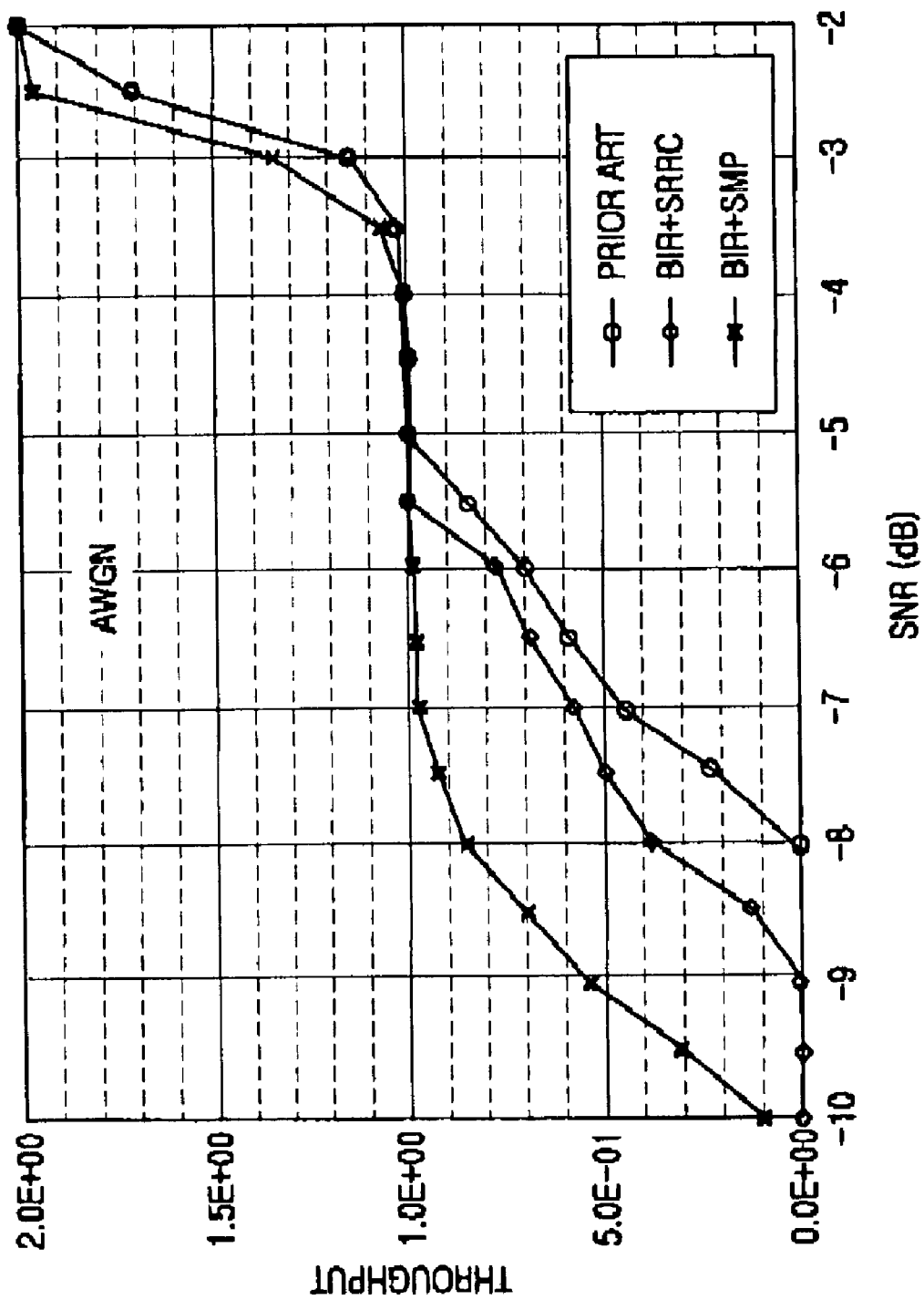
FIG. 14 illustrates a comparison between frame error rates at retransmissions according to an embodiment of the present invention and at a retransmission according to a conventional method under an AWGN environment.

FIG. 14 illustrates graphs comparing throughputs of retransmissions according to the present invention and a conventional method in terms of frame error rates under an AWGN environment. Referring to FIG. 14, PRIOR ART denotes a retransmission according to the conventional method, BIR+SMP denotes a retransmission according to the first embodiment of the present invention, and BIR+SRRC denotes a retransmission according to the second embodiment of the present invention. As noted from FIG. 14, BIR+SRRC brings a 0.5 to 1 dB error rate decrease and BIR+SMP brings an up to 2.5 dB error rate decrease, as compared to the conventional method.

In accordance with the present invention as described above, a combined use of BIR and SMP or BIR and SRRC effects a remarkable performance improvement without modifying the conventional packet retransmission method. Therefore, the reliabilities and error probabilities of transmitted bits are averaged at retransmission, decoding performance is improved, and transmission efficiency is increased.

The present invention is applicable to all transmitters irrespective of wireless or wired communication, and it can be expected that the overall system performance will be significantly improved without an increase in system complexity. That is, a decrease in BER from the existing systems leads to an increase in transmission throughput. By application of the present invention, retransmission techniques are effectively combined, not to speak of an effective combination of an initial transmission technique and a retransmission technique, creating a synergy of benefits.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of retransmitting data in a mobile communication system, the method comprising the step of:
    generating first coded bits by encoding information data;
    selectively performing at least one of the following operations of (a) outputting the first coded bits, (b) generating second coded bits by separating the first coded bits into a first bit group having a relatively high priority and a second bit group having a relatively low priority, and exchanging the first bit group with the second bit group, (c) generating third coded bits by inverting at least part of the first coded bits, and (d) generating fourth coded bits by inverting at least part of the second coded bits;
    generating a modulation symbol by mapping a selected one of the first coded bits, the second coded bits, the third coded bits, and the fourth coded bits to the modulation symbol using one corresponding signal constellation; and
    transmitting the modulation symbol to a receiver.

2. The method of claim 1, wherein one of the first to fourth coded bits are generated according to a sequence number of a retransmission request.

3. The method of claim 1, further comprising the step of interleaving the first bit group and the second bit group, respectively.

4. The method of claim 1, wherein the first bit group is exchanged with the second bit group, if MOD (N, $\log_2$ M) is less than 2, wherein the N is a sequence number of a retransmission request and the M is a modulation order of the signal constellation.

5. The method of claim 4, wherein the modulation order M is one of 16 and 64.

6. An apparatus for data retransmission in a mobile communication system, the apparatus comprising:
    an encoder for generating coded bits by encoding information data;
    an interleaver for separating the coded bits into a first bit group having a relatively high priority and a second bit group having a relatively low priority, and separately interleaving the first bit group and the second bit group to generate first coded bits having the first interleaved bit group and the second interleaved bit group;
    a bit rearrangement unit for generating second coded bits by exchanging the first interleaved bit group with the second interleaved bit group, generating third coded bits by inverting, on selected occasions, at least part of the first coded bits, and generating fourth coded bits by inverting at least part of the second coded bits; and
    a modulator for generating a modulation symbol by mapping a selected one of the first to fourth coded bits to the modulation symbol using one corresponding signal constellation.

7. The apparatus of claim 6, wherein the bit rearrangement unit inverts one of the first and the second coded bits according to a sequence number of a retransmission request.

8. The apparatus of claim 6, wherein the interleaver includes a first interleaver unit for interleaving the first bit group and a second interleaver unit for interleaving the second bit group.

9. The apparatus of claim 8, further comprising a parallel-to-serial converter for converting the outputs of the first and second interleaver units to a serial bit stream.

10. The apparatus of claim 6, wherein the bit rearrangement unit comprises an exchange for exchanging the first bit group with the second bit group according to a sequence number of a retransmission request, and an inverter for inverting the output of the exchange according the sequence number of the retransmission request.

11. The apparatus of claim 10, wherein the exchange exchanges the first bit group with the second bit group, if MOD (N, $\log_2$ M) is less than 2, wherein N is the sequence number of the retransmission request and M is a modulation order of the signal constellation.

12. The apparatus of claim 11, wherein the modulation order M is one of 16 and 64.

13. A method of receiving retransmission data in a mobile communication system, the method comprising the steps of:
    receiving a modulation symbol from a transmitter;
    demodulating the modulation symbol using one signal constellation and outputting first coded bits;
    selectively performing at least one of the following operations of (a) outputting the first coded bits, (b) generating second coded bits by;
    separating the first coded bits into a first bit group and a second bit group and exchanging the first bit group with second bit group, (c) generating third coded bits by inverting at least part of the first coded bits, and (d) generating fourth coded bits by inverting at least part of the second coded bits; and
    decoding a selected one of the first to fourth coded bits to output information data.

14. The method of claim 13, wherein one of the first to fourth coded bits are generated according to a sequence number of a retransmission request.

15. The method of claim 13, further comprising the step of interleaving the first bit group and the second bit group respectively before the decoding step.

16. The method of claim 15, wherein the first bit group are exchanged with the second bit group, if MOD (N, $\log_2$ M) is less than 2, wherein the N is the sequence number of the retransmission request and the M is a modulation order of the signal constellation.

17. The method of claim 16, wherein the modulation order M is one of 16 and 64.

18. An apparatus for receiving retransmission data in a mobile communication system, the apparatus comprising:
- a demodulator for demodulating a received modulation symbol using signal constellation and outputting first coded bits;
- a bit rearrangement unit for selectively performing at least one of the following operations of (a) outputting the first coded bits, (b) generating second coded bits by separating the first coded bits into a first bit group and a second bit group and exchanging the first bit group with second bit group, (c) generating third coded bits by inverting at least part of the first coded bits, and (d) generating fourth coded bits by inverting at least part of the second coded bits;
- a deinterleaver unit for separating a selected one of the first to fourth coded bits into two bit groups and deinterleaving the two bit groups, separately; and
- a decoder for decoding the deinterleaved bit groups to output information data.

19. The apparatus of claim 18, wherein one of the first to fourth coded bits are generated according to a sequence number of a retransmission request.

20. The apparatus of claim 18, wherein the deinterleaver unit includes a first deinterleaver unit for deinterleaving one of the two bit groups and a second deinterleaver unit for deinterleaving another one of the two bit groups.

21. The apparatus of claim 18, wherein the bit rearrangement unit comprises an inverter for inverting the first coded bits according a sequence number of a retransmission request and an exchange for exchanging the first bit group with the second bit group according to the sequence number of the retransmission request.

22. The apparatus of claim 21, wherein the exchange exchanges the first bit group with the second bit group, if MOD (N, $\log_2$ M) is less than 2, wherein the N is the sequence number of the retransmission request and the M is a modulation order of the signal constellation.

23. The apparatus of claim 22, wherein the modulation order M is one of 16 and 64.

* * * * *